March 22, 1960 K. I. L. SKOOG 2,929,882

FINDING AND IDENTIFYING DEVICE

Filed Jan. 23, 1957 2 Sheets-Sheet 1

INVENTOR
KARL IVAN LENNART SKOOG

BY Hane and Nydick
ATTORNEYS

March 22, 1960 K. I. L. SKOOG 2,929,882

FINDING AND IDENTIFYING DEVICE

Filed Jan. 23, 1957 2 Sheets-Sheet 2

INVENTOR
KARL IVAN LENNART SKOOG
BY Hane and Nydick
ATTORNEYS

United States Patent Office 2,929,882

Patented Mar. 22, 1960

2,929,882

FINDING AND IDENTIFYING DEVICE

Karl Ivan Lennart Skoog, Bandhagen, Stockholm, Sweden, assignor to Telefonaktiebolaget L M Ericsson, Stockholm, Sweden, a corporation of Sweden Application January 23, 1957, Serial No. 635,775

Claims priority, application Sweden February 4, 1956

3 Claims. (Cl. 179—18)

The present invention relates to a device for finding and identifying a marked, for example calling or idle circuit in a telephone system, wherein the marking is indicated by changing the polarity of one of a group of wires (single wire identifier). The wires are grouped to form a coordinate system. The coordinates may e.g. represent the units and tens digits, respectively, of the designations of the circuits. There are known numerous solutions of the identifying problem. The drawbacks of these solutions are that in some cases expensive equipments or complicated "and"-circuits having three conditions for operation or similar are required for selecting the desired line, and that in other cases (especially relay identifiers) a long time is required for identification.

The present invention is based upon delay lines, especially magnetostrictive delay lines and it affords a very inexpensive and reliable solution. The invention also permits the simultaneous identification of a plurality of calls. The device according to the invention can be designed for a varying number of circuits and with aid of different grouping methods. In the following embodiment of the invention showing a line identifier having 100 calling lines will be described and a suitable grouping plan has been selected, viz. a coordinate system having ten horizontal and ten vertical coordinates. The horizontal coordinates indicate the tens digit of the calling line (circuit) and calling line (circuit). At each cross point between the coordinates there is connected a so called "and"-circuit between the calling line and a reading wire, said reading wire being the horizontal coordinate and the outputs of said "and"-circuits being connected to the vertical coordinates. The condition for actuating the "and"-circuit is that the vertical coordinate receives a voltage when simultaneously a call potential appears and a voltage appears on the horizontal coordinate pertaining to the calling circuit. The identifier also includes a device for selecting one of a plurality of possible simultaneous calls.

Figure 1A:
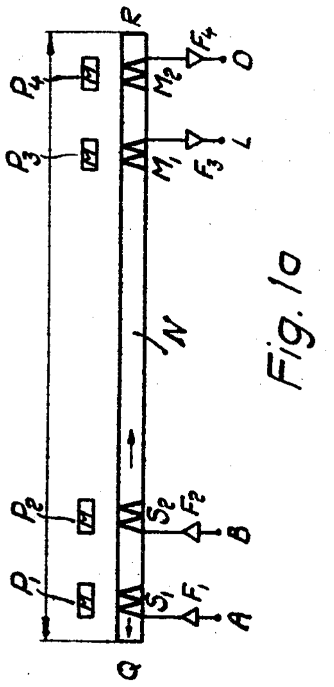

The invention will be described more in detail in connection with the accompanying drawing in which:

Fig. 1*a* shows the principle of a magnetostrictive delay line according to the invention.

Figure 1B:
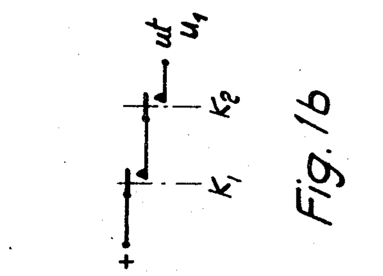
Figure 1C:
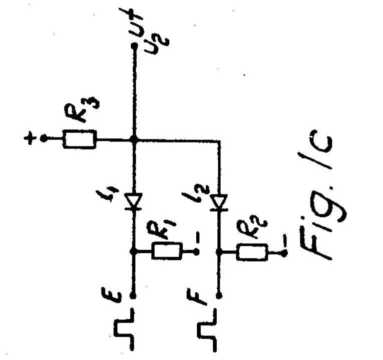
Figure 1D:
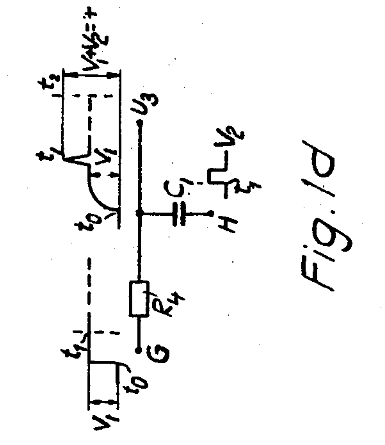

Figs. 1*b*–1*d* show embodiments of the "and"-circuits.

Figure 2:
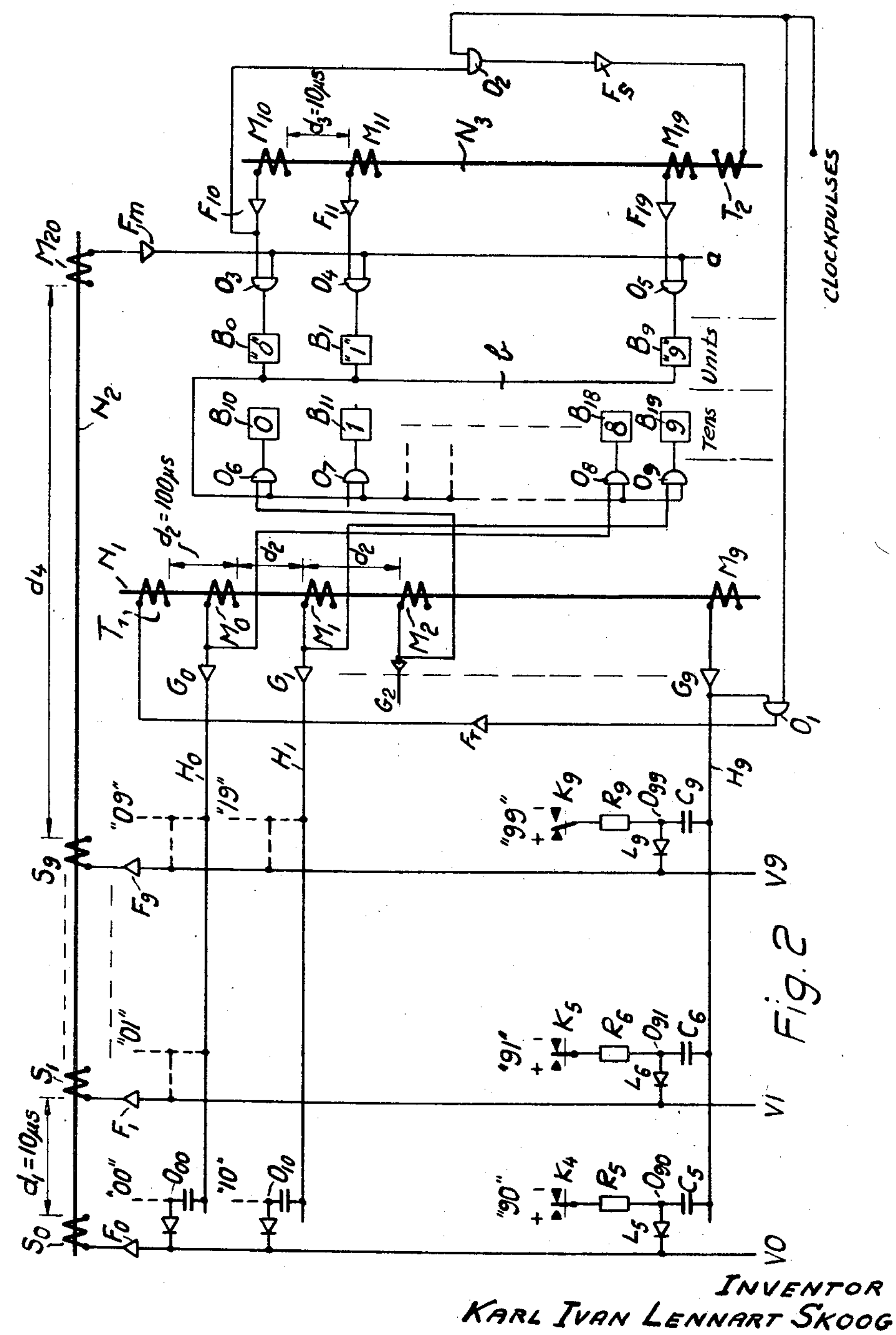

Fig. 2 shows an identifier for 100 calling circuits which is adapted for lock out.

Fig. 1*a* shows a nickel wire delay line N having the length 1, said said wire being provided with input coils $S_1$ and $S_2$, permanent magnets $P_1$–$P_4$, output coils $M_1$ and $M_2$ and amplifiers $F_1$–$F_4$. The permanent magnets P are used for setting up a magnetic field in the nickel wire N. If an impulse is applied at the input A the winding $S_1$ is actuated and thereby the magnetic field in the wire adjacent to $S_1$ is changed. This field change generates an acoustic wave which propagates on one hand against Q and on the other hand against R. After a time proportional to the distance between the input coil $S_1$ and the output coil $M_1$ the acoustic wave arrives at the output coil $M_1$ and actuates the magnetic field there. An impulse is induced in from the output coil $M_1$ which impulse is amplified in the amplifier $F_3$. If an impulse is simultaneously applied at both $S_1$ and $S_2$, two acoustic waves are obtained which arrive at the output coil $M_1$ with a time difference proportional to the difference between input coils $S_1$ and $S_2$. The impulses of course appear also at the output coil $M_2$ but at a later time which is determined by the distance between coils $M_1$ and $M_2$.

Fig. 1*b* shows an example of a basic "and"-circuit having two relay contacts $K_1$ and $K_2$ and a known output $U_1$. Fig. 1*c* shows an electronic equivalent having rectifiers $1_1$, $1_2$, resistors $R_1$–$R_3$, inputs E, F and a known output $U_2$, and Fig. 1*d* shows an electronic equivalent comprising a resistor $R_4$, a condenser $C_1$, inputs G and H and an ouput $U_3$. If a sufficient voltage $$V_1+V_2=\text{plus } (+)$$

is to be obtained at an output $U_3$ a voltage is required at both the inputs G and H (Fig. 1*d*). The time-voltage diagrams above and below Fig. 1*d* show the voltage $V_1$ on the input G which is applied at the time $t_0$, the voltage $V_2$ on the input H which is applied at the time $t_1$ and the voltage $V_1+V_2$ on the output $U_3$ from the time $t_0$ to $t_2$.

Fig. 2 shows an identifier for a number of calling circuits, comprising delay lines $N_1$, $N_2$, $N_3$, amplifiers $F_s$, $F_m$, $F_0$–$F_{19}$, $G_0$–$F_{19}$, bistable circuits $B_0$–$B_{19}$, "and"-circuits $O_1$–$O_9$ and $O_{00}$–$O_{99}$, input coils $S_0$–$S_9$ and $T_1$ and $T_2$, output coils $M_0$–$M_{20}$, resistors $R_5$–$R_9$ and condensers $C_5$–$C_9$ comprised in the "and"-circuits and rectifiers $L_5$–$L_9$ for preventing back current paths. The calling lines are grouped in ten vertical columns $V_0$–$V_9$ and 10 horizontal rows $H_0$–$H_9$.

Only the "and"-circuits $O_{90}$, $O_{91}$ and $O_{99}$ which are of the kind shown in Fig. 1*d*, are completely shown.

The delay lines $N_1$ and $N_3$ are of the recirculating kind, that is, the last receiving coils $M_9$ and $M_{10}$ respectively are connected to the input coils $T_1$ and $T_2$ respectively. The timing of the pulses is controlled by clock pulses which by means of the "and"-circuits $O_1$ and $O_2$ respectively control the time position of the pulses on the delay lines $N_1$ and $N_3$. The "and"-circuits $O_1$ and $O_2$ are open only when pulses are present, both on the outputs from the coils $M_9$ and $M_{10}$ respectively and the clock pulse line. The fed back pulses are amplified by amplifiers $F_s$ and $F_t$ respectively.

The operation of the identifier is as follows:

When an impulse is recirculating in the delay line $N_1$, the receiving coils $M_0$ to $M_9$ are sequentially generating output pulses as the acoustic wave is passing the coils. The distance between the coils is such that the time interval between the pulses on adjacent coils is for instance 100 microseconds. When an impulse for example is emitted from the coil $M_9$, it is amplified by the amplifier $G_9$ and applied to the horizontal conductor $H_9$ which is connected to the condenser input of all the "and"-circuits of the ninth row, that is, the "and"-circuits pertaining to the subscribers $N_0$ 90–99. The subscribers are each provided with a switch contact which is connected to a positive potential when the subscriber is calling, but is otherwise connected to a negative potential. In the drawing only one of the subscribers, namely $N_0$ 99 is shown in the calling state and therefore only the output of the "and"-circuit $O_{99}$ will generate an impulse as the contact $K_9$ is the only in the ninth row which is connected to a positive potential. This impulse is applied to the column conductor $V_9$ and via the amplifier $F_9$ to the input coil $S_9$ on the magnetostrictive delay line $N_2$. An acoustic wave is caused in the magnetostrictive line which propagates along the line to the coil $M_{20}$.

The time delay between consecutive input coils on the delay line $N_2$ is a fraction of the time delay between consecutive output coils on the delay line $N_0$. If, as is shown in the drawing, the delay time between consecutive coils on the delay line $N_1$ is 100 microseconds, the delay time between consecutive coils on the delay line $N_2$ is selected to be ten microseconds for ten vertical conductors $V_0$ to $V_9$. The distance $d_4$ between the last input coil $S_9$ and the output coil $M_{20}$ is in the embodiment selected to be 100 microseconds. If pulses are simultaneously applied to all the vertical conductors $V_0$–$V_0$, they will thus be received ten microseconds separated during the time interval 100 to 190 microseconds after the pulse is applied. Thus the impulse which was applied to the horizontal conductor $H_9$ thousand microseconds after the same impulse was generated by the input coil $T_1$ will arrive at the output coil $M_{20}$ eleven hundred microseconds after the scanning pulse was initiated by the coil $T_1$. By means of the recirculating delay line $N_3$ a second pulse source with ten outputs is obtained where the pulses of adjacent outputs are ten microseconds time displaced. As is mentioned above, the recirculation on the delay line $N_3$ is controlled by the same clock pulses which control the recirculation on the line $N_1$ and thus each of the pulses which arrive at the output coil $M_{20}$ will be in phase with one impulse obtained from one of the outputs of the delay line $N_3$. Thus the impulse originating from the "and"-circuit "99" will be in phase with the pulse of the coil $M_{10}$. The latter pulse is after amplification in an amplifier $F_{19}$ applied to one input of an "and"-circuit $O_5$ the other input of which is connected to the output coil $M_{20}$. When the impulses from $M_{20}$ and $M_{19}$ are coincident a trigger pulse is obtained from the output of the "and"-circuit $O_5$ which triggers the bistable circuit $B_9$ indicating the units digit "9" of the calling subscriber. When the circuit $B_9$ has operated an output voltage is obtained therefrom on the wires which is applied to one input of the "and"-circuits $O_6$ to $O_9$. Said output voltage, however, does not appear until the next pulse has been emitted from the output coil $M_0$ and thus said pulse does not open the "and"-circuit $O_8$. However, when the impulse through the delay line $N_1$ arrives at the output coil $M_1$ both the impulse of the "and"-circuit $O_9$ are conditioned for passing an impulse to the output. The output pulse of the "and"-circuit $O_9$ triggers the bistable circuit $B_{19}$ which indicates the ten digit of the calling subscriber. Now both the digits of the calling subscriber's number are identified. In order to prevent more than one subscriber from being identified at one time and to prevent false identifications an inhibit circuit (not shown) may be arranged which prevents more than one output pulse from the output coil $M_{20}$ from triggering more than one of the bistable circuits $B_0$–$B_9$ at a time. In the same way precautions may be taken such that only one of the bistable circuits $B_{10}$–$B_{19}$ can be operated. Thus only one of the bistable circuits $B_0$–$B_{19}$ and one of the bistable circuits $B_{10}$–$B_{19}$ can be operated during one and the same identification operation until the inhibit condition is removed after a completed identification.

By means of arranging additional suitably spaced output coils on the delay line $N_2$ further identification operations can be made simultaneously.

The invention is applicable not only to line identifiers, but it can as well be applied in other circuits for finding and identifying calling or idle circuits, particularly in electronic telephone systems.

I claim:

1. In a device for finding and identifying a marked circuit element among a plurality of similar elements, in combination, rows and columns of conductors forming a coordinate system, a coincidence circuit individual to each element and having at least two inputs and one output at each cross point between a row conductor and a column conductor, the column conductor being connected to the output and the row conductor being connected to one input, the second input of each coincidence circuit being connectable to a source of marking potential in the respective circuit element, means for sequentially applying mutually time displaced scanning pulses to said row conductors causing a pulse at the outputs of the coincidence circuits having a marking potential on the second input, a delay line having a plurality of equally spaced inputs, each connected to one of the column conductors and at least one output for separating pulses simultaneously applied to said column conductors in time, the delay time between the first and last input on said delay line being less than the interval between successive scanning pulses, and means for separating at least one of the time distributed pulses appearing on said output by means of coincidence with a selection signal having the corresponding time position.

2. A device as claimed in claim 1 wherein said means for separating at least one of the time distributed pulses appearing on the output of the delay line comprises a cyclically operating recirculating delay line having the same number of equally spaced outputs as the number of column conductors, the period of said pulse source being completed during the interval between consecutive scanning pulses, a two input coincidence circuit for each phase output having a first input connected to the delay line output and the second input connected to the pertaining phase output, and bi-stable circuit means each indicating a column containing a marked element, the output of the last mentioned coincidence circuits being each connected to a respective one of said indicating devices.

3. A device as claimed in claim 2 and comprising means for indicating coincidence between the scanning pulses and the operation of any of said bi-stable circuit means, second bi-stable circuit means each indicating a row containing a marked element, each of said means being connected to a respective one of said second bi-stable circuit means.

References Cited in the file of this patent

UNITED STATES PATENTS

| | | |
|---|---|---|
| 2,749,387 | Barlow et al. | June 5, 1956 |
| 2,808,459 | Barlow et al. | Oct. 1, 1957 |